June 5, 1956  W. R. BOYD ET AL  2,748,764
VISUAL TRAINING DEVICES
Filed Jan. 2, 1953  2 Sheets-Sheet 1
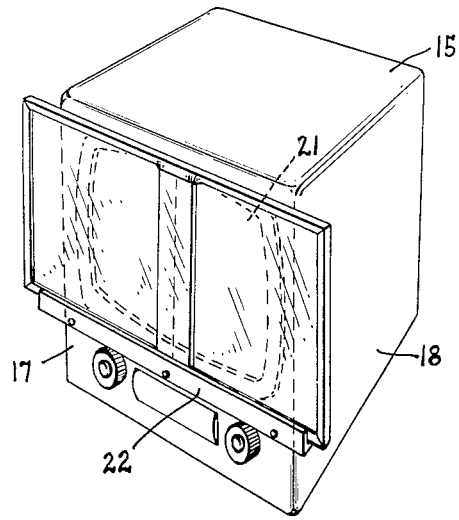
Fig. 1
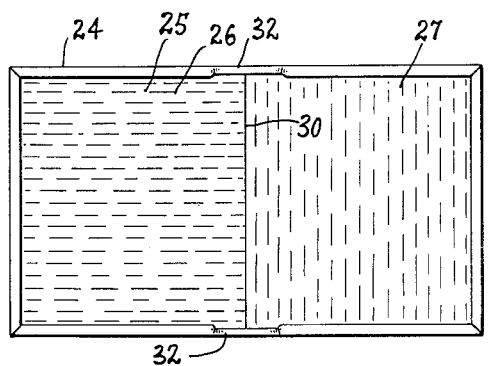
Fig. 2
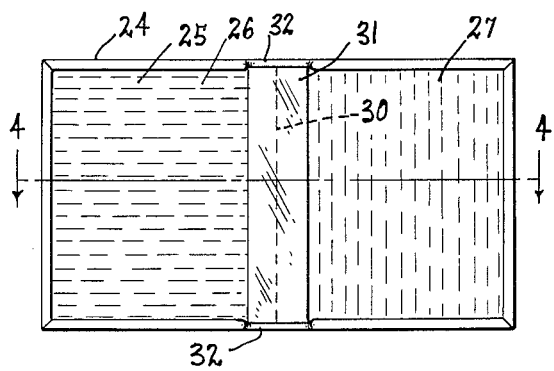
Fig. 3
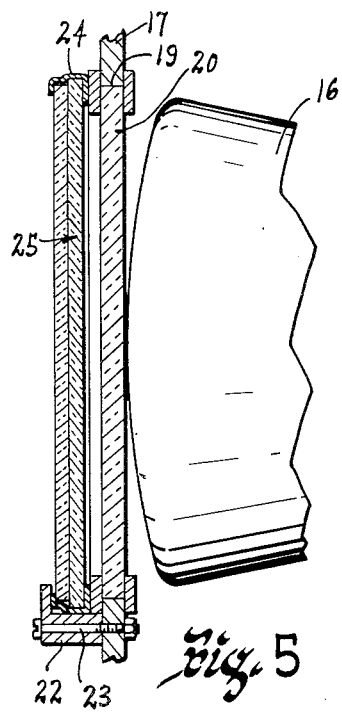
Fig. 5
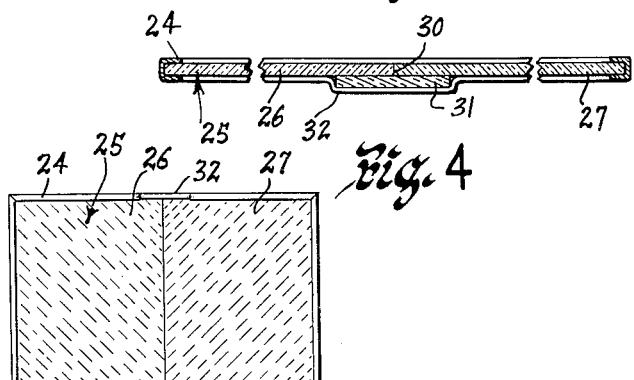
Fig. 4
Fig. 14
INVENTOR
W. RAYMOND BOYD
SALVI S. GRUPPOSO
BY
ATTORNEY INVENTORS
W. RAYMOND BOYD
SALVI S. GRUPPOSO
BY
*Louis L. Gagnon*
ATTORNEY

United States Patent Office 2,748,764
Patented June 5, 1956

2,748,764

VISUAL TRAINING DEVICES

Walter Raymond Boyd, East Woodstock, Conn., and Salvi S. Grupposo, Natick, Mass., assignors to American Optical Company, Southbridge, Mass., a voluntary association of Massachusetts Application January 2, 1953, Serial No. 329,216

14 Claims. (Cl. 128—76.5)

This invention relates to improvements in visual training devices and has particular reference to the provision of a novel visual training device for use in the treatment of binocular instabilties, amblyopia and other generally similar visual deficiencies.

One of the principal objects of this invention is to provide a simple and efficient visual training device which embodies a visual field comprising a composite imagery having fixed and moving form characters therein with given portions of the fixed form characters being rendered selectively visible to the respective eyes of the patient and with the moving form characters being rendered alternately visible to the respective eyes when the patient attempts sustained visual continuity of said composite imagery whereby the moving form characters will function cooperatively with the selectively visible fixed form characters to stimulate the patient's interest and concentration upon said visual field and introduce a desired visual training in attempting to retain said sustained visual continuity.

Another object is to provide a novel device of the above character wherein a portion of the fixed form characters is viewed simultaneously by both eyes of the patient and the moving form characters are rendered visible to both eyes simultaneously as they alternate between the vision of the respective eyes.

Another object is to provide a visual training device which embodies a single transparent sheet-like element adapted to be positioned between a selected visual field and the eyes of a patient wearing light-altering elements thereover, which transparent element is formed with at least two areas having different light-altering characteristics cooperatively functioning with the elements worn by the patient whereby only predetermined portions of the visual field will be visible to the individual eyes, and an additional light-altering element positioned over said transparent element and covering adjoining portions of each area having different light-altering characteristics for effecting overcoming the light-altering characteristics of said covered portions and thus rendering light passing through said covered portions visible to both eyes simultaneously.

Another object is to provide a device of the above character wherein the transparent sheet-like element comprises a sheet of material having one portion thereof linear light-polarizing along an axis of polarization corresponding to the axis of polarization of one of a pair of light-polarizing analyzers worn by the patient and having another linear light-polarizing portion thereof in edge-to-edge relation to the first light-polarizing portion, the axis of polarization of the second light-polarizing portion being disposed at an angle of substantially 90° to the axis of polarization of the first light-polarizing portion and substantially parallel to the axis of polarization of the second of the pair of analyzers, and wherein the additional superimposed light-altering element comprises a strip of transparent polarization modifying material such as plastic film which is circular or eliptical light-polarizing whereby the light-polarizing effect of the areas covered by the strip of polarization modifying material is overcome.

Still another object is to provide a device of the above character wherein the superimposed strip of light-altering material is easily mounted in or removed from superimposed position on the sheet-like element whereby it may be used to provide a binocular fusion or fusion stimulus area if desired or left off if so desired.

Another object is to provide a training device of the above character wherein the width of the binocular fusion area can be varied as desired under given conditions of use or at various stages of treatment.

A still further object is to provide a training device of the above character wherein the polarization characteristics of the transparent element are such that the element can be inverted or turned around without affecting the treatment in any way.

Other objects and advantages of the invention will become apparent from the following description taken in connection with the accompanying drawings, in which:

Fig. 1 is a front perspective view of a preferred embodiment of the invention shown in position of use;

Fig. 2 is a front elevational view of a portion of a device embodying the invention;

Fig. 3 is a front elevational view of the complete light-altering device;

Fig. 4 is a horizontal sectional view taken substantially on line 4—4 of Fig. 3;

Fig. 5 is a vertical sectional view of the device illustrated in Fig. 3 showing it in position of use;

Fig. 14 is a reduced front elevational view similar to Fig. 2 illustrating a modification of the device.

Figure 6:
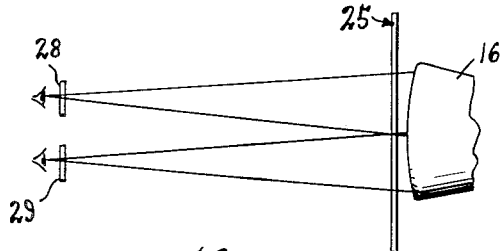
Fig. 6 is a diagrammatic top plan view illustrating the effect of positioning the device shown in Fig. 2 in position of use before a television screen.
Figure 7:
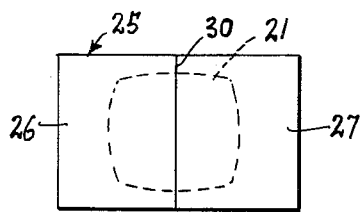
Fig. 7 is a diagrammatic front elevational view illustrating the positional relation of the device to the picture area coinciding with the position illustrated in Fig. 6.

It is well known that individuals often have considerable difficulty in maintaining sustained binocular fusion due, perhaps, to imbalances between the two eyes, suppression of one eye or other visual deficiencies. In many cases a dominant eye is unconsciously used to a considerable extent whereupon suppression of the other eye occurs. It is necessary, that the suppressed or deficient eye be exercised in such a manner that it will be forced into use during treatment more than or approaching the amount of use of the dominant eye and thereby eventually bring about a more normal coordination of the two eyes.

Various methods have been employed in an attempt to develop binocular stability, which methods are in some cases mechanical, generally of a somewhat complicated nature, and thus relatively expensive. Such mechanical methods also generally require a patient to make continued visits to a doctor's office for treatments. More recent devices have been developed which may be used in the home with targets such as television or movie screens whereby the patient may receive efficient and beneficial treatment economically, privately, and conveniently in his own home; however, such devices have been restricted to only one specific technique of treatment.

The present invention is directed primarily to the provision of a training device which comprises a transparent sheet-like element having two light-altering portions located in edge-to-edge relation with each other which may be employed in one technique of treatment, and further having, for use therewith in other techniques, a transparent element which is preferably removably superimposed over a portion of the sheet-like element to effectively overcome or modify the light-altering characteristics of both light-altering portions in the area covered by the removable element, thus rendering light passing through the covered area visible to both eyes simultaneously and creating a binocular fusion or fusion stimulus area.

Referring more particularly to the drawings wherein like characters of reference designate like parts throughout the several views, the invention is shown as being applied for use with a television receiver 15 of conventional type. The receiver 15 is provided with a cathode ray picture tube 16 which is provided with the usual screen upon which fixed and moving form characters are formed by conventional electronic methods. The front panel 17 of the cabinet 18 housing the picture tube 16 is provided with an opening 19 therein in which is located a protective glass 20 through which the face of the tube 16 is viewed. The visible area of the tube as viewed through the opening 19 is the picture area and corresponds to the area designated by numeral 21 in Figs. 1, 7, 9, 11 and 13.

Attached to the front panel 17 of the cabinet 18 beneath the opening 19 is a transversely extending shelf 22 which may be suitably secured to the front panel 17 by bolts 23 or the like. The upper side of the shelf 22 is preferably provided with a longitudinal slot which is adapted to receive the lower edge of a relatively rigid frame 24 which encloses a sheet 25 of transparent material. The sheet 25 is of a size to completely cover the picture area and to extend on each side thereof substantially beyond the picture area.

The transparent sheet 25 is preferably formed of plastic material and is provided with a pair of left and right linearly polarized areas 26 and 27 respectively. The axes of polarization of the polarized areas 26 and 27 are at an angle of substantially 90° with respect to one another, with the axis of each respective left and right eye area 26 and 27 being substantially parallel with the axis of polarization of respective linearly polarized left and right eye lenses 28 and 29 (Figs. 6, 8, 10 and 12) of a pair of analyzers worn by a patient during treatment.

The entire sheet 25 is formed as a single integral unit with the polarized areas 26 and 27 being disposed in edge-to-edge relation, thus forming a line of demarcation 30 which extends vertically through approximately the center of the sheet 25 when in position of use.

A patient wearing the analyzers and looking at the picture area 21 will view through the right lens 29 and right polarized area 27 of the sheet 25 only that portion of the picture area 21 which is covered by the polarized area 27 since the opposed axes of polarization of the right lens 29 and left polarized area 26 prevent viewing of the remainder of the picture by the right eye. Accordingly the left eye will view only the portion of the picture area 21 which is covered by the left polarized area 26 having its axis of polarization substantially parallel with the axis of polarization of the left lens 28.

It is generally believed, however, that in treating patients for binocular instabilities for example, it is advisable to provide a fusion stimulus area, sometimes called a binocular fusion area. A fusion stimulus area is an area wherein both eyes of the patient can simultaneously fuse upon and view a portion of the picture area being observed during the treatment.

To provide a fusion stimulus area in the present device, there is placed in superimposed relation with the sheet 25 and on the side thereof disposed toward the patient a sheet, plate, or strip of transparent material having light-altering characteristics such as will effectively overcome or modify the light-polarizing characteristics of the portions of the sheet which it covers. Such a light-altering strip is indicated at 31 in the drawings and may be formed of cellophane or other similar depolarization modifying material such as quarter-wave plates which are elliptical or circular polarizing. Thus, with such a strip 31 superimposed upon the sheet 25, the portion of the picture area which can be seen through the strip 31 will be visible to both eyes simultaneously.

The frame 24 is preferably provided with means for holding the strip 31 in position against the surface of the sheet 25. Such means is shown in the drawings as comprising widened or outwardly flared portions 32 of the frame 24, the device being assembled by inserting one end of the strip 31 into one of the portions 32 and flexing the strip 31 to insert the other end in the opposed portion 32 of the frame. Inherent resiliency of the strip will normally cause it to become closely superimposed throughout its full length against the surface of the sheet 25.

The strips 31 may be provided in any desired widths whereby they will cover a controlled area of the sheet 25. For example, it is desirable to provide means for varying the width of the binocular fusion area at various stages of the treatment; that is, as the treatment progresses it is believed best to progressively decrease the width of the binocular fusion area. Also, it is desirable, because of variations in viewing distances as well as variations in sizes of the picture area, to provide means for varying the width of the binocular fusion area. Therefore, the portions 32 of the frame 24 are made sufficiently long to accommodate the widest strip 31, but, however, it is readily apparent that relatively narrow strips may be used to reduce the size of the binocular fusion area.

The widened portions 32 are also so located that a relatively wide strip 31 positioned therein will be superimposed over the line of demarcation 30 between the two polarized areas 26 and 27 and will cover adjoining marginal portions of each area 26 and 27 as shown in Fig. 3. Narrow strips 31, of course, can be so positioned in the portions 32 of the frame 24 as to similarly cover adjoining portions of both areas 26 and 27 or can be positioned so as to cover only a portion of one or the other of the areas 26 and 27 as desired.

A still further desirable feature of the present invention resides in the fact that the polarizing areas 26 and 27 are, to an observer who is not wearing polarizing analyzers, approximately of substantially uniform density throughout. Also, when the strip 31 is in place, the entire sheet 25 will still appear to be uniform as to density since, although such an observer may be able to see the strip 31, he will not see any substantial change in picture quality or contrast discrimination in the visual field since the strip 31 will not substantially alter the over-all density of the device. Such control of the density of the device is believed to be of importance since it has been found that a patient, such as one member of a family, for example, can receive treatments by viewing a television screen while the other members of the family are simultaneously watching the same television screen. This is believed especially desirable when treating children since friends and relatives of a child can watch a television program simultaneously with the child, which will create greater interest of the child in the television program and thus tend to maintain sustained visual continuity which will, of course, aid in proper treatment.

Patient interest, particularly in children, is difficult to maintain. Therefore, a visual field comprising a composite imagery such as is produced by a television receiver when in operation has both fixed and moving form characters therein, with portions of the composite imagery being selectively visible only to the respective eyes. The moving form characters therein are rendered alternately visible to the respective eyes when the patient attempts visual continuity thereof during sustained viewing of the television screen as the moving form characters traverse the composite imagery whereby said composite imagery will stimulate the patient's interest and concentration and introduce a desired visual effort in attempting to maintain sustained visual continuity.

Figure 8:
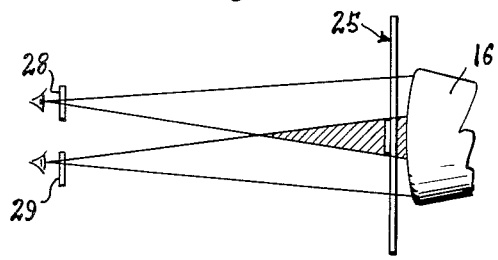
Figs. 8, 10 and 12 are views similar to Fig. 6 illustrating the effect of positioning the device shown in Fig. 3 at various locations with respect to the picture area.
Figure 9:
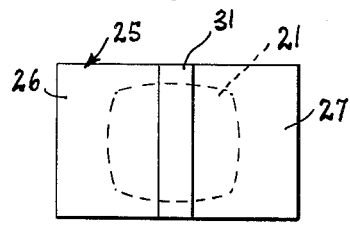
Figs. 9, 11 and 13 are view similar to Fig. 7 illustrating the positional relation of the device shown in Fig. 3 to the picture area coinciding with the positions illustrated in Figs. 8, 10 and 12.

With the left eye, as has been stated above, the patient will view through the lens 28 only the portion of the picture area which can be seen through the corresponding polarized portion 26 of the sheet 25, and with his right eye will view through the lens 29 only the portion of the picture area which can be seen through the corresponding polarized portion 27. This is illustrated in Fig. 6 wherein no binocular fusion area is shown. Referring to Fig. 8, however, it will be seen that a binocular fusion area is obtained by a strip 31 which provides an area as indicated by the shade lines through which both eyes of the patient can simultaneously view the portion of the picture area covered thereby, thus permitting binocular fusion of the patient's eyes.

Figure 10:
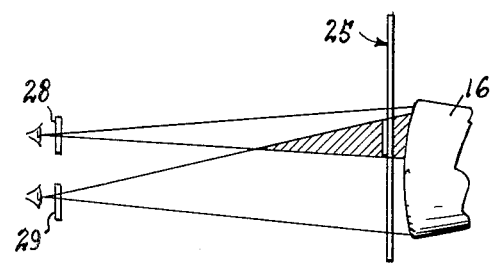
Figure 11:
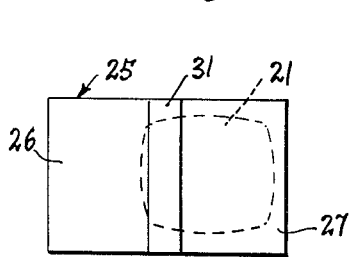
Figure 12:
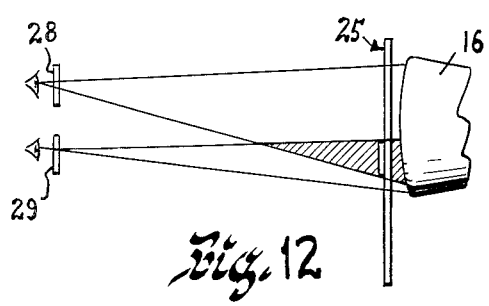
Figure 13:
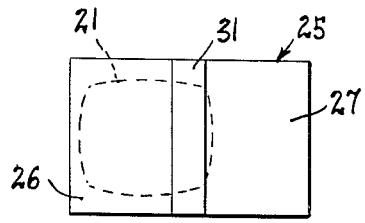

In the example illustrated in Figs. 10 and 11, the transparent sheet 25 is moved to the left whereupon a greater portion of the picture area 21 is rendered visible to the right eye while only a small portion thereof is rendered visible to the left eye. Figs. 12 and 13 illustrate the effect of moving the transparent member to the right whereupon a greater portion of the picture area is visible to the left eye than is visible to the right eye.

From the foregoing, it will be apparent that as a patient views form characters formed by the television cathode ray tube 16 and tries to assimilate the entire composite imagery his eyes will tend to follow the moving form characters as they traverse the picture area 21, and, with the background of fixed characters being visible, his interest will be increased and, consequently, he will concentrate on the picture area. For example, if a moving form character such as an animal is viewed at the right side of the picture area 21 against a scenic background, it will be viewed by the right eye only, since the axis of polarization of the overlying right polarized area 27 of the sheet 15 is substantially at right angles to the axis of polarization of the lens 28 which is located before the left eye. Then, if the animal moves across the scene transversely of the picture area 21, it will come into the area superimposed by the strip 31 whereupon both the right and left eyes will be permitted to focus upon and view the animal binocularly. Then, upon continued movement of the animal to the left side of the picture area 21, it will be rendered visible only to the left eye since the axis of polarization of the adjacent overlying polarized area 26 of the sheet 25 is substantially parallel with the axis of polarization of the lens 28 located before the left eye.

If it is desired that one eye be exercised and used more than the other eye during the treatment, the transparent member is accordingly moved either to the left or to the right as shown in Figs. 11 and 13 whereupon a greater portion of the picture area can be rendered visible to the eye needing the additional stimulus.

Although the foregoing description refers particularly to a transparent sheet 25 adapted to be superimposed before a television screen, it is to be understood that a transparent member of this type can be equally well adapted for superimposition with a translucent screen on which moving pictures are projected by conventional projection methods. In either case, a single picture area containing form characters is provided, with said form characters having continuity of action and being movable from the field of vision of one eye into the field of vision of the other eye.

A further desirable feature is that when the sheet 25 it provided with polarizing areas 26 and 27 which are polarizing along axes which extend diagonally of each area as shown in Fig. 14, the sheet 25 may be inverted or turned completely around without altering the resultant effect upon the vision of the patient, it being assumed, of course, that the analyzers worn by the patient are polarizing along respective axes corresponding to the axes of polarization of the areas 26 and 27.

While the light-altering or modifying strip 31 has been described hereinbefore as removable from the device, it is to be understood that it may be desirable to attach the strip 31 to the device through the use of a suitable cement in which case the strip will function in the manner desired without possessing the adjustability factor provided by selection of strips of varying sizes.

From the foregoing description, it is evident that a device formed in accordance with the above teaching is simple in construction, arrangement and operation and thereby rendered possible for home use.

It is apparent that all of the objects and advantages of the invention have been accomplished. It will also be apparent, however, that changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

We claim:

1. A visual training device comprising viewing means embodying a pair of lenses adapted to be positioned before the eyes of an individual and through which a visual field is adapted to be viewed, said lenses each embodying different light-altering characteristics, and light-altering means interposed between said viewing means and said visual field comprising a pair of portions having different light-altering characteristics for co-operation with the respective lenses of said viewing means to render selected areas of said visual field visible to the respective eyes, and a transparent member superimposed upon a portion of said light-altering means, and having means for effectively modifying the light-altering characteristics of the portion of the light-altering means over which it is superimposed to render visible through each lens the portion of the visual field positioned therebehind whereby binocular fusion is stimulated when the individual views said visual field through said transparent member and portion of the light-altering means covered thereby.

2. A visual training device comprising viewing means embodying a pair of light-polarizing lenses adapted to be positioned before the eyes of an individual and through which a visual field is adapted to be viewed, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarization portions co-operating with the respective lenses of said viewing means to render selected areas of said visual field visible to the respective eyes, and a transparent quarter wave plate superimposed upon a portion of said light-altering means, said transparent quarter wave plate effectively modifying the light-polarizing characteristics of the portion of the light-altering means over which it is superimposed whereby binocular fusion is stimulated when the individual views said visual field through said transparent quarter wave plate and portion of the light-altering means covered thereby.

3. A visual training device comprising viewing means embodying a pair of light-polarizing lenses adapted to be positioned before the eyes of an individual and through which a visual field is adapted to be viewed, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarizing portions co-operating with the respective lenses of said viewing means to render selected areas of said visual field visible to the respective eyes, and a removable transparent depolarizing member superimposed upon a portion of said light-altering means, said transparent depolarizing member effectively modifying the light-polarizing characteristics of the portion of the light-altering means over which it is superimposed whereby binocular fusion is stimulated when the individual views said visual field through said transparent member and portion of the light-altering means covered thereby.

4. A visual training device comprising viewing means embodying a pair of linear light-polarizing lenses adapted to be positioned before the eyes of an individual and through which a visual field is adapted to be viewed, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarizing portions co-operating with the respective lenses of said viewing means to render selected areas of said visual field visible to the respective eyes, and a transparent member superimposed upon a portion of said light-altering means, said transparent member being circular-polarized for effectively modifying the light-polarizing characteristics of the portion of the light-altering means over which it is superimposed whereby binocular fusion is stimulated when the individual views said visual field through said transparent member and portion of the light-altering means covered thereby.

5. A visual training device comprising viewing means embodying a pair of lenses adapted to be positioned before the eyes of an individual and through which is adapted to be viewed a visual field having moving form characters therein, said lenses each embodying different light-altering characteristics, and light-altering means interposed between said viewing means and said visual field comprising a pair of portions having different light-altering characteristics for co-operation with the respective lenses of said viewing means whereby selected areas of said visual field are rendered visible to the respective eyes and the moving form characters traversing said visual field will be rendered alternately visible to each respective eye when the individual viewing said form characters attempts visual continuity during sustained viewing of said visual field, and a transparent member superimposed upon a portion of said light-altering means, said transparent member having means effectively overcoming the light-altering characteristics of the portion of the light-altering means over which it is superimposed to render visible through each lens the portion of the visual field therebehind whereby binocular fusion is stimulated when the individual views said visual field through said transparent member and portion of the light-altering means covered thereby.

6. A visual training device comprising viewing means embodying a pair of light-polarizing lenses adapted to be positioned before the eyes of an individual and through which is adapted to be viewed a visual field having moving form characters therein, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarizing portions co-operating with the respective lenses of said viewing means whereby selected areas of said visual field are rendered visible to the respective eyes and the moving form characters traversing said visual field will be rendered alternately visible to each respective eye when the individual viewing said form characters attempts visual continuity during sustained viewing of said visual field, and a transparent member embodying a quarter wave plate superimposed upon a portion of said light-altering means for effectively modifying the light-polarizing characteristics of the portion of the light-altering means over which it is superimposed whereby binocular fusion is stimulated when the individual views said visual field through said transparent member and portion of the light-altering means covered thereby.

7. A visual training device comprising viewing means embodying a pair of light-polarizing lenses adapted to be positioned before the eyes of an individual and through which is adapted to be viewed a visual field having moving form characters therein, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarizing portions co-operating with the respective lenses of said viewing means whereby selected areas of said visual field are rendered visible to the respective eyes and the moving form characters traversing said visual field will be rendered alternately visible to each respective eye when the individual viewing said form characters attempts visual continuity during sustained viewing of said visual field, and a transparent depolarizing member superimposed upon a portion of said light-altering means for effectively modifying the light-polarizing characteristics of the portion of the light-altering means over which it is superimposed whereby binocular fusion is stimulated when the individual views said visual field through said transparent member and portion of the light-altering means covered thereby.

8. A visual training device comprising viewing means embodying a pair of linear light-polarizing lenses adapted to be positioned before the eyes of an individual and through which is adapted to be viewed a visual field having moving form characters therein, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarizing portions co-operating with the respective lenses of said viewing means whereby selected areas of said visual field are rendered visible to the respective eyes and the moving form characters traversing said visual field will be rendered alternately visible to each respective eye when the individual viewing said form characters attempts visual continuity during sustained viewing of said visual field, and a transparent member superimposed upon a portion of said light-altering means, said transparent member being circular polarized for effectively modifying the light-polarizing characteristics of the portion of the light-altering means over which it is superimposed whereby binocular fusion is stimulated when the individual views said visual field through said transparent member and portion of the light-altering means covered thereby.

9. A visual training device comprising viewing means embodying a pair of lenses adapted to be positioned before the eyes of an individual and through which a visual field is adapted to be viewed, said lenses each embodying different light-altering characteristics, and light-altering means interposed between said viewing means and said visual field comprising a pair of portions having different light-altering characteristics for co-operation with the respective lenses of said viewing means to render selected areas of said visual field therebehind visible to the respective eyes, and a transparent member superimposed upon a portion of said light-altering means, said transparent member having means for effectively modifying the light-altering characteristics of the portion of the light-altering means over which it is superimposed to render visible through each lens the portion of the visual field therebehind whereby binocular fusion is stimulated when the individual views said visual field through said transparent member and portion of the light-altering means covered thereby, said portions of said light-altering means and said transparent member being of substantially equal density whereby the picture area will be substantially uniformly apparent throughout to an observer wearing no viewing means.

10. A visual training device comprising viewing means embodying a pair of light-polarizing lenses adapted to be positioned before the eyes of an individual and through which a visual field is adapted to be viewed, the axes of polarization of said lenses being substantially at right angles to each other, and light-altering means interposed between said viewing means and said visual field comprising a pair of light-polarization portions the axes of polarization of which are substantially at right angles to one another and substantially parallel with the axes of polarization of the respective lenses of said viewing means, said light-polarization portions co-operating with the respective lenses of said viewing means to render selected areas of said visual field visible to the respective eyes, and a transparent depolarization member superimposed upon a portion of said light-altering means for effectively modifying the light-polarizating characteristics of the portion of the light-altering means over which it is superimposed whereby binocular fusion is stimulated when the individual views said visual field through said transparent member and portion of the light-altering means covered thereby, said portions of said light-altering means and said transparent member being of substantially the same density whereby the picture area will be substantially uniformly apparent throughout to an observer wearing no viewing means.

11. A visual training device comprising viewing means embodying a pair of linear light-polarizing lenses adapted to be positioned before the eyes of an individual and through which a visual field is adapted to be viewed, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarizing portions co-operating with the respective lenses of said viewing means to render selected areas of said visual field visible to the respective eyes, and a transparent member superimposed upon a portion of said light-altering means, said transparent member being circular-polarized for effectively modifying the light-polarizing characteristics of the portion of the light-altering means over which it is superimposed whereby binocular fusion is stimulated when the individual views said visual field through said transparent member and portion of the light-altering means covered thereby, said portions of said light-altering means and said transparent member being of substantially the same density whereby the picture area will be substantially uniformly apparent throughout to an observer wearing no viewing means.

12. A visual training device comprising viewing means embodying a pair of lenses adapted to be positioned before the eyes of an individual and through which is adapted to be viewed a visual field having moving form characters therein, said lenses each embodying different light-altering characteristics, and light-altering means interposed between said viewing means and said visual field comprising a pair of adjacent portions having different light-altering characteristics for co-operation with the respective lenses of said viewing means whereby selected areas of said visual field are rendered visible to the respective eyes and the moving form characters traversing said visual field will be rendered alternately visible to each respective eye when the individual viewing said form characters attempts visual continuity during sustained viewing of said visual field, and a removable transparent member superimposed upon the parts of said light-altering means in contiguous relation, said transparent member having means for effectively modifying the light-altering characteristics of said parts of the light-altering means over which it is superimposed to render the portion of the visual field therebehind visible through both lenses whereby binocular fusion is stimulated when the individual views said visual field through said transparent member and portion of the light-altering means covered thereby, said portions of said light-altering means and said transparent member being of substantially the same density whereby the picture area will be substantially uniformly apparent throughout to an observer wearing no viewing means.

13. A visual training device comprising viewing means embodying a pair of light-polarizing lenses adapted to be positioned before the eyes of an individual and through which is adapted to be viewed a visual field having moving form characters therein, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarizing portions co-operating with the respective lenses of said viewing means whereby selected areas of said visual field are rendered visible to the respective eyes and the moving form characters traversing said visual field will be rendered alternately visible to each respective eye when the individual viewing said form characters attempts visual continuity during sustained viewing of said visual field, and a transparent member superimposed upon a portion of said light-altering means, said transparent member having means effectively depolarizing the light-polarizing characteristics of the portion of the light-altering means over which it is superimposed whereby binocular fusion is stimulated when the individual views said visual field through said transparent member and portion of the light-altering means covered thereby, said portions of said light-altering means and said transparent member being of substantially the same density whereby the picture area will be substantially uniformly apparent throughout to an observer wearing no viewing means.

14. A visual training device comprising viewing means embodying a pair of linear light-polarizing lenses adapted to be positioned before the eyes of an individual and through which is adapted to be viewed a visual field having moving form characters therein, the axes of polarization of said lenses being substantially at right angles to each other, and light-altering means interposed between said viewing means and said visual field comprising a pair of light-polarizing portions the axes of polarization of which are substantially at right angles to one another and substantially parallel with the axes of polarization of the respective lenses of said viewing means, said light-polarizing portions co-operating with the respective lenses of said viewing means whereby selected areas of said visual field are rendered visible to the respective eyes and the moving form characters traversing said visual field will be rendered alternately visible to each respective eye when the individual viewing said form characters attempts visual continuity during sustained viewing of said visual field, and a transparent member superimposed upon a portion of said light-altering means, said transparent member being circular polarized for effectively modifying the light-polarizing characteristics of the portion of the light-altering means over which it is superimposed whereby binocular fusion is stimulated when the individual views said visual field through said transparent member and portion of the light-altering means covered thereby, said portions of said light-altering means and said transparent member being of substantially the same density whereby the picture area will be substantially uniformly apparent throughout to an observer wearing no viewing means.

References Cited in the file of this patent

UNITED STATES PATENTS

| | | |
|---|---|---|
| 2,280,297 | Neumueller | Apr. 21, 1942 |

FOREIGN PATENTS

| | | |
|---|---|---|
| 264,615 | Great Britain | Jan. 27, 1927 |
| 552,582 | Great Britain | Apr. 15, 1943 |
| 682,350 | Great Britain | Nov. 5, 1952 |